United States Patent
Hoss et al.

(10) Patent No.: US 10,012,198 B2
(45) Date of Patent: Jul. 3, 2018

(54) TEST PROCEDURE FOR HIGH-PRESSURE PUMPS

(71) Applicant: Robert Bosch GmbH, Stuttgart (DE)

(72) Inventors: Reinhard Hoss, Plochingen (DE); Dirk Doerhoefer, Owen (DE); Joachim Goeser, Donzdorf (DE); Karl-Martin Kutteruf, Neidlingen (DE); Markus Vogel, Albershausen (DE); Martin Maier, Hochdorf (DE); Thilo Bareuther, Plochingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/506,846

(22) PCT Filed: Jul. 13, 2015

(86) PCT No.: PCT/EP2015/066002
§ 371 (c)(1),
(2) Date: Feb. 27, 2017

(87) PCT Pub. No.: WO2016/034315
PCT Pub. Date: Mar. 10, 2016

(65) Prior Publication Data
US 2017/0254307 A1 Sep. 7, 2017

(30) Foreign Application Priority Data
Sep. 1, 2014 (DE) .......... 10 2014 217 443

(51) Int. Cl.
*G01N 7/22* (2006.01)
*F02M 65/00* (2006.01)
*F02M 59/44* (2006.01)

(52) U.S. Cl.
CPC .......... *F02M 65/003* (2013.01); *F02M 59/44* (2013.01); *F02M 2200/02* (2013.01)

(58) Field of Classification Search
CPC ...... F02M 65/003; F02M 65/00; F02M 59/44; F02M 2200/02; F16K 37/0075; F02D 41/0025; G01N 3/12
(Continued)

(56) References Cited

U.S. PATENT DOCUMENTS 6,874,480 B1 * 4/2005 Ismailov ................. F02D 41/40
123/494
2007/0215110 A1 * 9/2007 Stein .................. F02D 19/0628
123/431
(Continued)

FOREIGN PATENT DOCUMENTS

DE    102005000612 A1    7/2006
DE    102005020362 A1    11/2006
(Continued)

OTHER PUBLICATIONS

International Search Report dated Sep. 29, 2015, of the corresponding International Application PCT/EP2015/066002 filed Jul. 13, 2015.

*Primary Examiner* — Manish S Shah
*Assistant Examiner* — Nigel Plumb
(74) *Attorney, Agent, or Firm* — Norton Rose Fulbright US LLP; Gerard Messina

(57) ABSTRACT

A method for testing a high-pressure pump, particularly a high-pressure pump which is provided to inject fuel into a combustion engine, the method including filling the high-pressure pump with a fluid prior to switching it on.

15 Claims, 1 Drawing Sheet

(58) Field of Classification Search
USPC ............. 73/168, 37, 114.41, 114.51, 114.38, 73/114.01
See application file for complete search history.

(56) References Cited

U.S. PATENT DOCUMENTS

| | | | | |
|---|---|---|---|---|
| 2013/0238217 A1* | 9/2013 | Nolan | ................. | F02D 41/3845 701/102 |
| 2014/0076291 A1* | 3/2014 | Wong | ................. | F02D 19/0647 123/568.11 |
| 2014/0100074 A1* | 4/2014 | Glugla | ................. | B60W 20/15 477/3 |
| 2014/0214306 A1* | 7/2014 | Badillo | ................... | F02D 19/08 701/104 |
| 2014/0222314 A1* | 8/2014 | Kurtz | ................... | F02D 41/403 701/104 |
| 2014/0224209 A1* | 8/2014 | Pursifull | ............ | F02M 63/0001 123/294 |

FOREIGN PATENT DOCUMENTS

| | | | |
|---|---|---|---|
| DE | 102010027675 | * 7/2010 | ........... F02M 65/002 |
| DE | 102009003236 A1 | 11/2010 | |
| DE | 102009045369 A1 | 4/2011 | |
| DE | 102010027675 A1 | 1/2012 | |
| EP | 1197649 A1 | 4/2002 | |
| SU | 823640 A1 | 4/1981 | |

\* cited by examiner

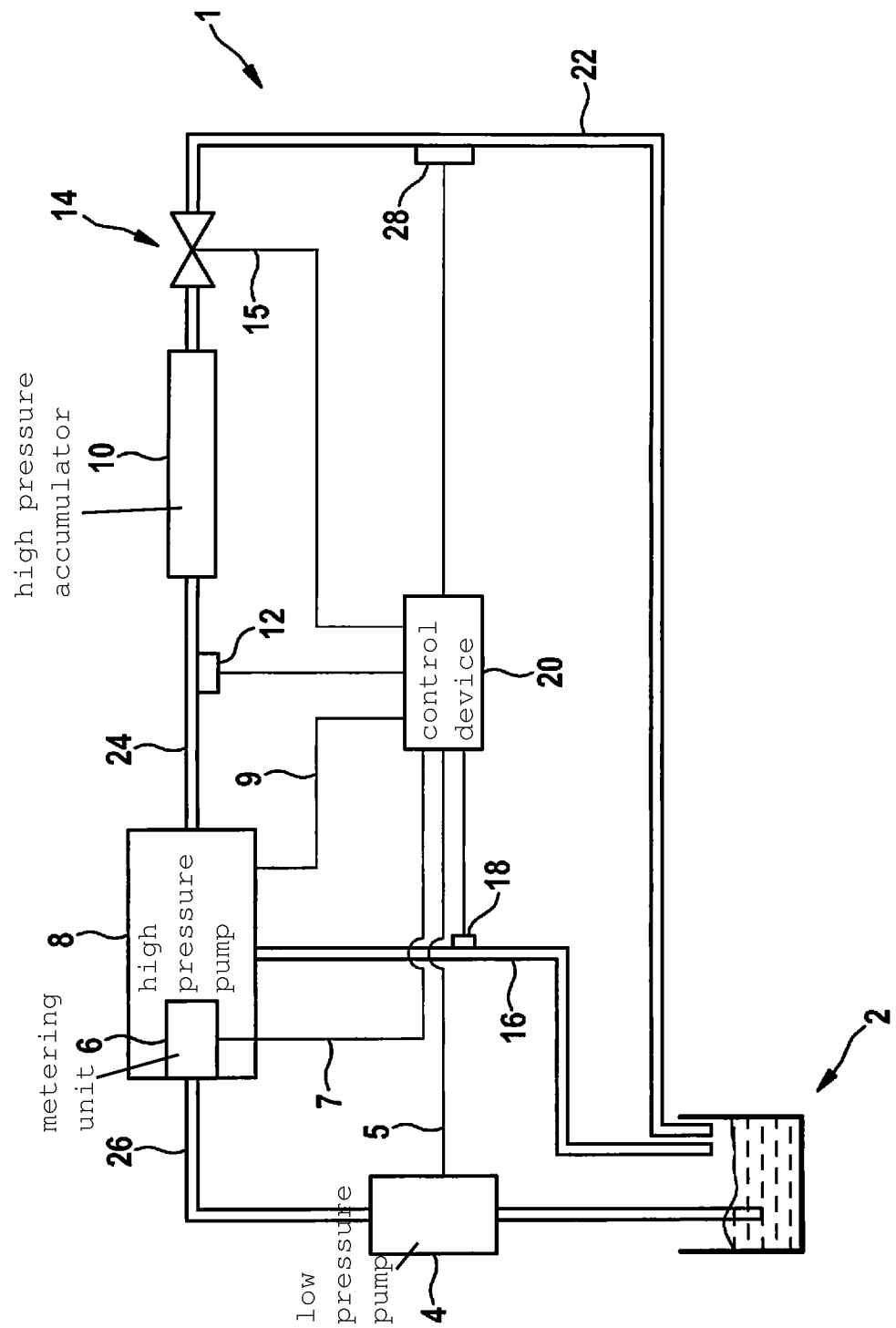

TEST PROCEDURE FOR HIGH-PRESSURE PUMPS

FIELD

The present invention relates to a test procedure for high-pressure pumps, particularly for high-pressure pumps that are provided to inject fuel into a combustion engine.

BACKGROUND INFORMATION

The conventional test procedures for high-pressure pumps which are provided to inject fuel into a combustion engine, what are referred to as "common-rail pumps", start by switching on the test-oil supply. Immediately after that, the high-pressure pump is started, that is, rotational speed is applied to it. The high-pressure pump delivers the test oil into a high-pressure accumulator (common rail), whose internal pressure at the start ("pressure at rest") is between 0 and 70 bar. This pressure at rest is a function of the design of the pressure regulating valves at the high-pressure accumulator.

After the setpoint speed is reached, the pressure control is started by supplying current to the pressure regulating valves that alter/adjust the outlet cross-section of the high-pressure accumulator in accordance with the setpoint pressure. Prior to a test-step change, which is associated with a modification of the speed of the high-pressure pump, the pressure regulating valves are de-energized for safety reasons in order to avoid an unintentional pressure rise in the high-pressure accumulator, or the pressure in the high-pressure accumulator is driven down to 0 bar. After the high-pressure pump has reached the next setpoint speed, the pressure in the high-pressure accumulator is set anew to the now desired (new) value, by suitable activation of the pressure regulating valves.

With the starting of test steps, a metering unit (MU) of the high-pressure pump is acted upon with the current provided in keeping with the test requirements. The MU regulates the feed quantity for the generation of high pressure in the low-pressure circuit of the high-pressure pump. The delivery quantity of the high-pressure pump is measured in each test step, and is the test criterion of the high-pressure pump.

SUMMARY

An object of the present invention is to improve the reliability of a test procedure for high-pressure pumps, and to reduce the wear of the high-pressure pump during the test procedure.

An example method for testing a high-pressure pump, particularly a high-pressure pump that is provided to inject fuel into a combustion engine, includes the step of filling the high-pressure pump with fluid before it is switched on. Filling the high-pressure pump with fluid before it is switched on ensures that the high-pressure pump is lubricated by the fluid from the beginning of its operation, thereby reducing its wear.

In one specific embodiment, the method includes switching on the high-pressure pump only after a return-flow quantity and/or a delivery quantity has/have been measured at the outputs of the high-pressure pump. This ensures that the high-pressure pump is filled with a sufficient quantity of fluid before it is switched on.

In one specific embodiment, the method includes filling a high-pressure accumulator with fluid by operation of the high-pressure pump, and already restricting an output or outlet of the high-pressure accumulator, e.g., by use of a suitable valve, prior to switching on the high-pressure pump.

In particular, the method may include that already prior to switching on the high-pressure pump, to energize an outlet valve which is provided at the outlet of the high-pressure accumulator, in order to adjust the fluid pressure in the high-pressure accumulator, and thus to already restrict the outlet of the high-pressure accumulator before the high-pressure pump is switched on.

In one specific embodiment, the method includes that even upon a change of the test step, not to reduce the pressure in the high-pressure accumulator to below a predetermined minimum pressure, especially a pressure of 200 bar.

By maintaining an elevated pressure in the high-pressure accumulator, which is connected to the output of the high-pressure pump, the roller tappet of the pump mechanism of the high-pressure pump is pressed onto its cam. In this manner, the "grinding" of the roller on the cam during start-up of the high-pressure pump is minimized, and rubbing places which would result in increased wear are avoided. The contact between the roller and the cam is improved, which means the system is less susceptible to dirt or other disturbances.

In one specific embodiment, the method includes measuring the pressure on the high-pressure or output side of the high-pressure pump, especially the pressure in the high-pressure accumulator, and activating a pressure control if the pressure exceeds a preset limiting value. This prevents the high-pressure accumulator, the pressure regulating valve and/or the high-pressure pump from being damaged by too high a pressure.

In one specific embodiment, the method includes that, especially after the warm-up of the high-pressure pump and prior to the beginning of the actual test procedure, to activate a metering unit of the high-pressure pump over a specified period of time with a frequency in the range between 1 Hz and 10 Hz, especially 2 Hz, in order to evacuate air from the high-pressure pump and to avoid measuring errors which may result if air is trapped in the high-pressure pump.

Moreover, in this way, a hysteresis of the metering unit is minimized, since sluggish behavior of the metering unit which may be caused, for example, by gumming after a longer shutdown and/or a longer storage, is prevented by the clocked activation described.

The present invention also includes an apparatus for testing a high-pressure pump, particularly a high-pressure pump that is provided to inject fuel into a combustion engine, having a fluid reservoir that is designed to make a fluid available, which is used for testing the high-pressure pump to be tested;

a low-pressure pump which is designed to convey fluid from the fluid reservoir into the high-pressure pump to be tested;

a high-pressure accumulator which is connected to a high-pressure output of the high-pressure pump;

a pressure regulating valve which is designed to regulate the pressure in the high-pressure accumulator; and a control device, which is designed to control the low-pressure pump, the high-pressure pump to be tested and the pressure regulating valve in such a way that the testing apparatus carries out a test procedure according to the present invention.

In particular, the apparatus may have at least one flow sensor and/or pressure sensor, which is/are designed to measure the flow rate and/or the pressure of fluid that has been delivered by the high-pressure pump, and to make the measuring result available to the control device, so that the control device is able to control or regulate the test procedure, taking into account the flow values and/or pressure values measured by the at least one flow sensor and/or pressure sensor.

BRIEF DESCRIPTION OF THE DRAWING

The invention is explained in greater detail below on the basis of the FIGURE, which shows a schematic view of one exemplary embodiment of a testing apparatus 1 for a high-pressure pump 8.

DETAILED DESCRIPTION OF EXAMPLE EMBODIMENTS

Testing apparatus 1 includes a tank 2 for storing and making a fluid ("test oil") available, which is removed from tank 2 during operation by a low-pressure pump 4 and supplied through a low-pressure line 26, which is connected to the output of low-pressure pump 4, to high-pressure pump 8 to be tested. High-pressure pump 8 includes at its input, which is connected to low-pressure line 26, a metering unit 6 that is designed to supply fluid, delivered by low-pressure pump 4, in metered fashion to high-pressure pump 8.

The output side of high-pressure pump 8 is connected via a high-pressure line 24 to a high-pressure accumulator ("common rail"), which during operation, is filled with fluid by high-pressure pump 8.

In addition, high-pressure pump 8 has a first return line 16 which makes it possible to return excess fluid that is used to cool and lubricate high-pressure pump 8 but is not supplied to high-pressure accumulator 10, back into tank 2.

Provided at an output/outlet of high-pressure accumulator 10 is at least one pressure regulating valve 14 which, by altering the cross-section of the outlet of high-pressure accumulator 10, makes it possible to set the fluid pressure in high-pressure accumulator 10 to a desired value.

An output side of pressure regulating valve 14 is connected to a second return line 22, through which the fluid from high-pressure accumulator 10 is returned to tank 2.

A control device 20 is connected via control lines 5, 7, 9, 15, which may be implemented electrically, mechanically, hydraulically or pneumatically, to low-pressure pump 4, metering unit 6, high-pressure pump 8 and pressure regulating valve 14, and equipped to control these components during operation via control lines 5, 7, 9, 15 in such a way that testing device 1 carries out the desired test procedure.

In addition, provided on high-pressure line 24 and/or at high-pressure accumulator 10 is at least one sensor 12, which measures the pressure and/or the flow of the fluid in high-pressure line 24, and makes the result available to control device 20.

Moreover, on each of the two return lines 16, 22, a return-flow sensor 18, 28 is provided, which measures the pressure and/or the flow through respective return line 16, 22 and makes its measuring results available to control device 20.

Before high-pressure pump 8 is started, it is filled with fluid from tank 2 by operation of low-pressure pump 4. To that end, low-pressure pump 4 generates a fluid pressure which is greater than the opening pressure of the internal valves of high-pressure pump 8. High-pressure pump 8 is started only after a delivery quantity and/or a return-flow quantity has/have been measured at the outputs of high-pressure pump 8 by sensors 12, 18.

In this manner, it is ensured that the contact point between the cam and the roller of the pump mechanism of high-pressure pump 8 is moistened with fluid before high-pressure pump 8 is started, so that lubrication of high-pressure pump 8 is guaranteed, and in particular, grinding of the roller during the start-up of high-pressure pump 8 is reliably avoided.

Already prior to the start-up of high-pressure pump 8, pressure regulating valve 14 is acted upon by current and is thereby at least partially closed, so that during the start-up of high-pressure pump 8, especially already after one half revolution of high-pressure pump 8, an elevated pressure of, e.g., 200 bar is obtained in high-pressure accumulator 10.

As soon as the pressure in high-pressure accumulator 10 or in high-pressure line 24 exceeds a preset limiting value, the control is switched to a precise pressure control in order to adjust the desired pressure in high-pressure accumulator 10. The lubrication of high-pressure pump 8 is also improved by this measure, and the rubbing of the roller on the cam during the start-up of high-pressure pump 8 is minimized. Moreover, the contact between the roller and the cam is improved, which means high-pressure pump 8 is more impervious to dirt or other disturbances.

When changing between various test steps, which are associated with a different rotational speed of high-pressure pump 8 and/or a different pressure in high-pressure accumulator 10, the pressure in high-pressure accumulator 10 and in high-pressure line 24 is not reduced to below a predetermined minimum pressure of, e.g., 200 bar, in order to maintain sufficient lubrication of high-pressure pump 8 and to minimize the rubbing of the roller on the associated cam.

After the warm-up of high-pressure pump 8 and still prior to the beginning of the actual test procedure, metering unit 6 is activated in clocked fashion, for example, with a frequency in the range of 1 Hz to 10 Hz, especially 2 Hz. Air is evacuated from high-pressure pump 8 by the clocked activation of metering unit 6, and faulty measurements, which may be caused by air trapped in high-pressure pump 8, are avoided. Moreover, an unwanted hysteresis of metering unit 6 is minimized, since sluggish behavior of metering unit 6, e.g., because of a gumming of the bearings, is prevented by the clocking.

As a consequence, the wear of high-pressure pump 8 to be tested is reduced, and measuring results are generated that are reproducible reliably and with high accuracy.

What is claimed is:

1. A method for testing a high-pressure pump, comprising:
    filling the high-pressure pump with a fluid prior to switching it on; and
    metering the fluid to the high-pressure pump at a frequency in a range of 1 Hz to 10 Hz, the metering being performed by a metering unit.

2. The method as recited in claim 1, wherein the high-pressure pump is designed to inject fuel into a combustion engine.

3. The method as recited in claim 1, further comprising:
    switching on the high-pressure pump only after at least one of a return-flow quantity and a delivery quantity has been measured at outputs of the high-pressure pump.

4. The method as recited in claim 1, further comprising:
    filling a high-pressure accumulator by way of the high-pressure pump; and
    restricting an outlet of the high-pressure accumulator prior to switching on the high-pressure pump.

5. The method as recited in claim 4, further comprising: prior to switching on the high-pressure pump, energizing a pressure regulating valve which is provided at an outlet of the high-pressure accumulator to already restrict the outlet of the high-pressure accumulator before the high-pressure pump is switched on.

6. The method as recited in claim 4, further comprising: measuring the pressure in the high-pressure accumulator, and activating a pressure control if the pressure in the high-pressure accumulator exceeds a preset limiting value.

7. The method as recited in claim 4, wherein the method includes that even upon a change of the test step, in case of a modification of the setpoint pressure, not to reduce the pressure in the high-pressure accumulator to below a predetermined minimum pressure.

8. The method as recited in claim 7, wherein the predetermined minimum pressure is a pressure of 200 bar.

9. The method as recited in claim 1, wherein the frequency is 2 Hz.

10. An apparatus for testing a high-pressure pump, comprising:
    a fluid reservoir designed to make a fluid available;
    a low-pressure pump designed to convey fluid from the fluid reservoir into a high-pressure pump to be tested;
    a high-pressure accumulator connected to a high-pressure output of the high-pressure pump;
    a pressure regulating valve designed to regulate pressure in the high-pressure accumulator;
    a metering unit to meter the fluid to the high-pressure pump; and
    a control device designed to control the low-pressure pump, the high-pressure pump to be tested and the pressure regulating valve, wherein the control device is designed to control the low-pressure pump, the high-pressure pump to be tested and the pressure regulating valve in such a way that the apparatus causes the high-pressure pump to fill with a fluid prior to switching it on, and to control the metering unit to meter the fluid to the high-pressure pump at a frequency in a range of 1 Hz to 10 Hz.

11. The apparatus for testing a high-pressure pump as recited in claim 10, wherein the apparatus has at least of at least one flow sensor and pressure sensor which is designed to measure at least one of a flow rate and a pressure of fluid that has been delivered by the high-pressure pump, and to make the measuring result available to the control device.

12. The method as recited in claim 1, wherein the metering evacuates air from the high-pressure pump.

13. The method as recited in claim 1, wherein the metering is performed after warm-up of the high-pressure pump and prior to any other test steps.

14. The method as recited in claim 1, wherein the metering unit is activated in clocked fashion in the frequency range of 1 Hz to 10 Hz.

15. The apparatus as recited in claim 10, wherein the metering unit is activated in clocked fashion in the frequency range of 1 Hz to 10 Hz.

\* \* \* \* \*